UNITED STATES PATENT OFFICE.

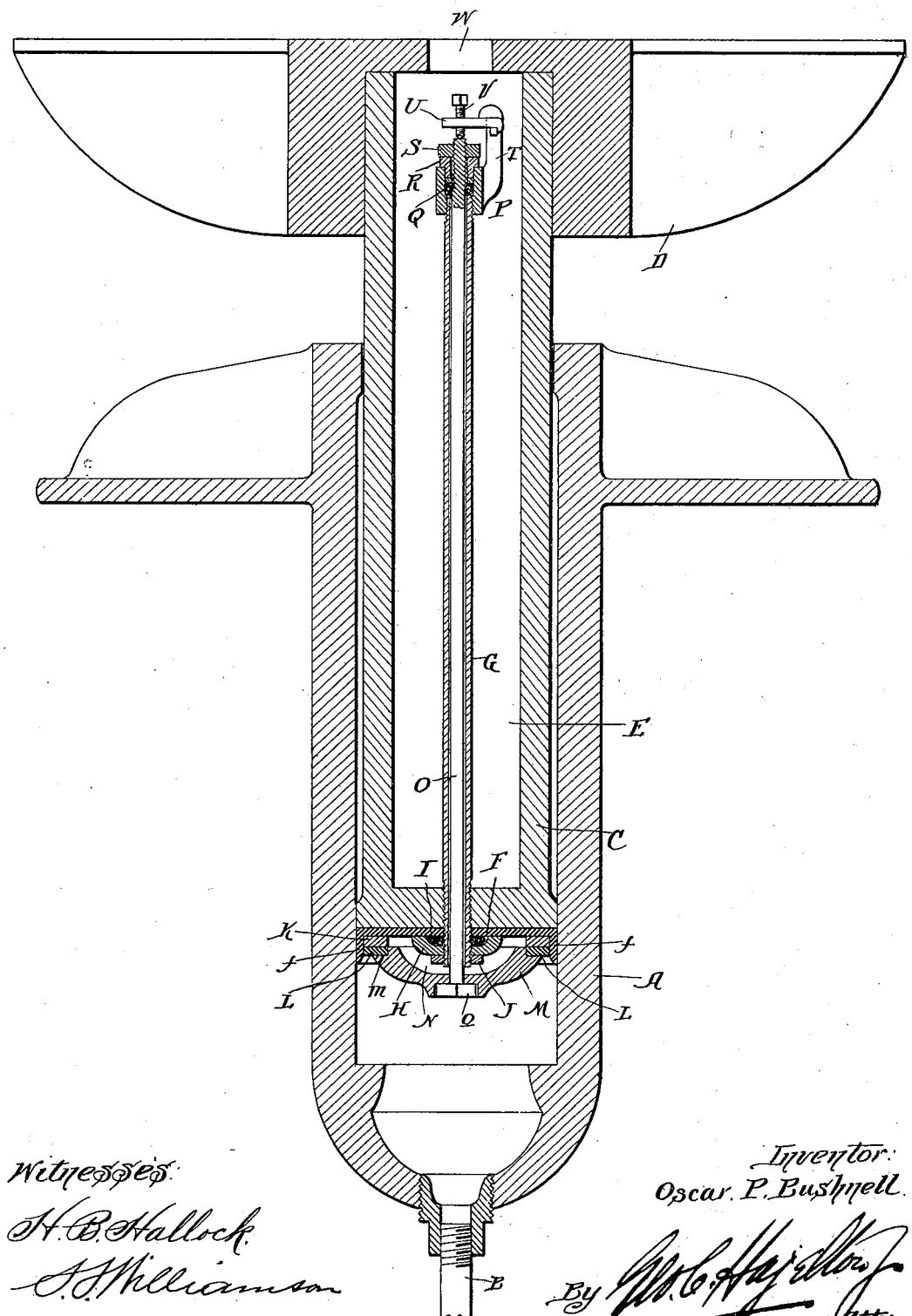

OSCAR P. BUSHNELL, OF MOUNT GILEAD, OHIO.

ADJUSTABLE HYDRAULIC PACKING.

SPECIFICATION forming part of Letters Patent No. 651,161, dated June 5, 1900.

Application filed December 28, 1899. Serial No. 741,792. (No model.)

*To all whom it may concern:*

Be it known that I, OSCAR P. BUSHNELL, a citizen of the United States, residing at Mount Gilead, county of Morrow, and State of Ohio, have invented a certain new and useful Improvement in Adjustable Hydraulic Packing, of which the following is a specification.

My invention relates to a new and useful improvement in adjustable hydraulic packing, and has for its object to provide an exceedingly simple and effective apparatus, whereby the packing is kept in the closest possible contact to the sides of the cylinder by means of adjustment which is readily accessible from the outside of the piston, thus necessitating no long stops in the operation of the machinery and avoiding the necessity of removing any portion of the machinery in so operating the adjusting apparatus and in so constructing all parts that they may be readily interchangeable.

With these ends in view this invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawing, forming a part of this specification, in which is represented a longitudinal section of a hydraulic ram.

In carrying out my invention as here embodied, A represents a cylinder, water being introduced through a pipe B at the lower end.

C is the piston, on the upper end of which is set the spider D for receiving the load. The piston C is bored out within a short distance of its lower end, as indicated at E, and against this closed lower end is placed an inverted-cup-shaped packing F, the rim $f$ of which bears against the side of the cylinder.

G is a tube threaded through the closed end of the piston and passing on through the packing F has threaded upon its protruding end the recessed washer H, the recess in said washer being filled with any suitable packing, as indicated at I, thus preventing any leakage from passing around the threaded portion of the tube G and also serving to bind the packing F closely against the face of the closed end of the piston.

J is a lock-nut threaded upon the end of the tube G and bearing against the washer H for holding said washer in its proper position.

K is a metal ring lying within the cavity and against the bottom of the cup-shaped packing F, and upon this metal ring is placed a ring L, of any suitable elastic material, its periphery bearing against the rim of the packing F.

M is a cap recessed, as indicated at N, so as to clear the washer H and lock-nut J, the periphery of this cap being notched, as indicated at $m$, so as to bear against the two exposed surfaces of the elastic ring L, thus confining this elastic ring upon three sides by metal and the other side or its periphery bearing against the packing F. As will be readily seen, any pressure brought to bear against this cap which will force it toward the piston will cause this elastic ring L to expand, and thereby forcing the rim $f$ against the side of the cylinder and thereafter affording a better contact therebetween. Means for accomplishing this are furnished by the rod O, which passes through the center of the cap M and onward through the tube G and to a point near the open end of the piston. A square head $o$, being formed on the lower end of this rod, fits into a corresponding squared recess in the cap M, thereby preventing the rod from turning.

Threaded upon the upper end of the tube G is an adjustable head P, said adjustable head P having a recess formed therein, as indicated at Q, for the reception of suitable packing, which fits closely around the rod O, and thereby preventing any leakage around the rod into the hollow E of the piston D. A gland R rests upon this packing, and a rim formed upon the upper end of this gland bears against the upper side of the nut of the adjustable head P. The rod O extends a slight distance above the gland R and has threaded thereon the nut S.

T is a lug extending upward from the adjustable head P, and extending at right angles from the lug T is a removable arm U, and through this arm is threaded a set-screw V, said set-screw bearing against the upper end of the rod O for the purpose of limiting its upward motion.

When the packing becomes so worn as to permit of a leakage around the same, the operation of tightening said packing is as follows: Through the hole W, formed for the purpose in the center of the spider D, the set-screw V is loosened, and then the nut S is turned, so as to draw the rod O upward, said rod in its turn drawing the cap M, and thereby squeezing the elastic ring, so as to force it outward against the rim $f$ of the packing F, and when the desired tightness is secured then the set-screw is screwed down upon the end of the rod, thereby holding it securely in place. The arm U and the set-screw V, threaded into it, are made removable for the purpose of better manipulating the nut S.

Having thus fully described my invention, what I claim as new and useful is—

1. The combination in an adjustable hydraulic packing of a cylinder and hollow piston, said piston being closed at one end, packing substantially cup-shaped in cross-section secured against the end of the piston and bearing against the cylinder, a tube threaded through the closed end of the piston and protruding through the packing, a recessed washer threaded on the protruding end, said recessed washer being adapted to be filled with any suitable packing, a lock-nut also threaded on the protruding end and bearing against the recessed washer, a metal ring lying against the cup-shaped packing, an elastic ring on the metallic ring bearing against the rim of the packing, a recessed cap having its periphery notched to bear against the elastic ring, said cap being held in position by a rod, said rod passing through the center of the cap and onward through the tube, said rod having a square head on its lower end adapted to fit in a corresponding square recess in the cap; said rod having means at its opposite end for adjusting the packing, as and for the purpose set forth.

2. The combination of an adjustable hydraulic packing, a cylinder and hollow piston open at one end and closed at the other, an inverted-cup-shaped packing lying against the closed end of the piston, a tube threaded through the center of the closed end of the piston and passing through the cup-shaped packing, a recessed washer threaded upon the end of the tube protruding below said packing and bearing against the same, suitable packing within the recess in said washer, a lock-nut threaded upon the end of tube protruding beyond the recessed washer, a metal ring lying against the bottom of the cup-shaped packing, an elastic ring fitting within the rim of the cup-shaped packing and lying next to the metal ring, a cap with an angular periphery, the two members of said angle bearing against the two exposed surfaces of the elastic ring, a rod passing through the center of said cap and tube, an enlarged head upon the end of said rod for engaging the cap, and means at the opposite end of the piston for drawing on said rod, thereby forcing the cap to expand said elastic ring against the rim of the cup-shaped packing, as and for the purpose specified.

3. The combination of an adjustable hydraulic packing, a cylinder and hollow piston open at one end and closed at the other, an inverted-cup-shaped packing lying against the closed end of the piston, a tube threaded through the center of the closed end of the piston and passing through the cup-shaped packing, a recessed washer threaded upon the end of tube protruding below the packing and bearing against the same, suitable packing within the recess in said washer, a lock-nut threaded upon the end of tube protruding beyond the recessed washer, a metal ring lying against the bottom of the cup-shaped packing, an elastic ring fitting within the rim of the cup-shaped packing and lying next to the metal ring, a cap with an angular periphery, the two members of said angle bearing against the two exposed surfaces of the elastic ring, a rod passing through the center of said cap and tube, an adjusting-head threaded upon the opposite end of tube, packing surrounding rod and lying within a recess in said adjusting-head, a gland resting against said packing, an adjusting-nut threaded upon the end of rod protruding beyond said gland, and a set-screw threaded through an arm extending from the adjusting-head and bearing against the end of said rod, all substantially as described and for the purpose specified.

In testimony whereof I have hereunto affixed my signature in the presence of two subscribing witnesses.

OSCAR P. BUSHNELL.

Witnesses:
B. D. BUXTON,
M. BURR LOHNEY.